United States Patent [19]

Berghell

[11] 4,317,030

[45] Feb. 23, 1982

[54] MAILING PACKAGE FOR FACILITATING AUTOMATIC SORTING OF MAIL

[76] Inventor: Robin C. Berghell, 1250 Westholme Ave., Los Angeles, Calif. 90024

[21] Appl. No.: 60,216

[22] Filed: Jul. 24, 1979

[51] Int. Cl.$^{3}$ ........................ G06K 21/04; B07C 5/342

[52] U.S. Cl. ................................ 235/489; 229/68 R; 209/900; 250/569; 235/489;494

[58] Field of Search ...................... 209/900; 229/68 R; 250/568, 569; 35/73, 35 H

[56] References Cited

U.S. PATENT DOCUMENTS

| | | | |
|---|---|---|---|
| 2,129,834 | 9/1938 | Funk | 35/35 H |
| 2,304,517 | 12/1942 | White | 229/71 |
| 2,377,346 | 6/1945 | Horr | 40/491 X |
| 2,775,405 | 12/1956 | Paston | 229/68 R X |
| 2,922,234 | 1/1960 | Patterson | 35/73 |
| 3,531,628 | 9/1970 | White, Jr. | 229/71 X |
| 3,898,434 | 8/1975 | Bigelow et al. | 235/494 |
| 3,933,094 | 1/1976 | Murphy et al. | 229/68 R |

*Primary Examiner*—Stephen P. Garbe

*Attorney, Agent, or Firm*—Fulwider, Patton, Rieber, Lee & Utecht

[57] ABSTRACT

A method and apparatus for facilitating the automatic sorting of mail by optical scanning equipment is provided and includes a first, usually dark-colored sheet, and a second sheet of a generally light-colored material overlying the first sheet and having a coded array of apertures therethrough, thereby permitting the first sheet to be read by the optical scanning equipment through the apertures in the second sheet. The array of apertures in the second sheet is coded to represent a desired original address, and a second array of apertures can be provided representing a return address. In such a case, various facilities are provided to cause the first sheet to selectively underlie either the original or return coded arrays of apertures so that the scanning equipment will read the desired address code.

4 Claims, 10 Drawing Figures

MAILING PACKAGE FOR FACILITATING AUTOMATIC SORTING OF MAIL

BACKGROUND OF THE INVENTION

This invention relates generally to automatic sorting of articles of mail, and more particularly, to a method and apparatus for facilitating the automatic sorting of mail by optical scanning equipment.

The sorting and processing of mail by most postal services today still involve a number of manual operations. Accordingly, mail frequently moves slowly, and postal services often incur large deficits due to their high labor costs. In order to keep postal rates from escalating to prohibitive levels, improved methods for mail handling must be found.

Sorting of letters by electronic scanning of zip code numbers is being done by the U.S. Postal Service, but only to a limited extent. This system, known as Optical Character Recognition (OCR) provides for numerals imprinted on the face of envelopes to be scanned electronically, converting the shape of each character into digital data to be used for sorting and other processing purposes. It requires that letters to be processed in this manner have machine or typewritten addresses and otherwise conform to rigid specifications.

Other known coding and sorting methods which could possibly be adapted to use in the automated processing of mail include:

(1) The punching of postal cards and envelopes with zip code hole patterns in a manner corresponding to that used in the preparation of standard tabulating cards. Mail could then be sorted through use of pins, electrically charged brushes or light beams which penetrate through and sense hole patterns.

(2) The imprinting or marking on the white surface of envelopes or cards a pattern of black bars which would represent the address code. Through use of electronic scanners in which photoelectric cells are actuated by variances in reflected light, the automated sorting of mail could be accomplished.

(3) The placing with a graphite pencil of a mark in selected oblong circles preprinted on the face of a card or envelope. This system, known as mark sensing, would permit mail to be electronically sensed.

The foregoing methods require either unobstructed holes in the article through which various sensing means can extend, or imprinted characters, bars or manually entered marks precisely formed and positioned on the face of the article to enable electronic scanning. As will become increasingly evident, these methods of encoding and sensing are fundamentally different from those proposed under the present invention.

It will be appreciated that wider use of automatic sorting equipment to replace those operations presently being performed by the postal services, either partially or entirely by hand, would result in significantly lower costs and more rapid and reliable mail delivery. Accordingly, there exists a need for an effective, economical and uniform method and apparatus for automatically sorting mail. As will become apparent from the following, the present invention satisfies that need.

SUMMARY OF THE INVENTION

The present invention resides in a new and improved mailing package and method for facilitating automatic sorting of articles of mail by which both personal and commercial mail, as well as common periodicals such as newspapers and magazines, can be uniformly, easily and conveniently arranged to be sorted by optical scanning equipment. This is accomplished by providing a first generally dark-colored sheet in or on the article, and providing a second, generally light-colored sheet, overlying the first sheet and having a coded array of apertures therethrough so that the dark first sheet is visible only through the coded apertures in the second sheet, and the resulting array of apertures with a dark background can be read by the optical scanning equipment.

More specifically, the apparatus of the present invention can include a common letter size envelope in which is punched an array of generally rectangular apertures adjacent one end, which array is preselected to represent an intended addressee's zip code, or any other location identifying code. A black background is inserted in the envelope and constrained to remain behind the array of apertures by being printed on the correspondence inserted in the envelope in a position to underlie the array. Alternatively, a separate piece of black paper can be folded about one end of the correspondence in the envelope in order to be constrained beneath the array of apertures.

In accordance with a further feature of the present invention, mail can be arranged to be uniformly, easily and conveniently coded for automatic sorting by optical scanning equipment when addressed first to an addressee, and then for return to the addressor. This can be accomplished by providing both an original and a return array of coded apertures in the envelope, and further providing a foldable background sheet having both dark and light areas which can be selectively arranged below the original and return codes to cause the optical scanning equipment to read the desired code.

In an alternative form of the original and return mailing package of this invention, specially adapted for periodic billing purposes, the mailing envelope can be gang punched with the sender's return code, and a window can be provided in the region of the original address code. A billing statement and remittance transmittal form are arranged in the envelope to first display the addressee's code with a dark background in the window, and subsequently to place a dark background behind the return code for automatic sorting in the return direction.

Other features and advantages of the present invention will become apparent from the following detailed description, taken in conjunction with the accompanying drawings, which illustrate, by way of example, the principles of the invention.

DETAILED DESCRIPTION

Figure 1:
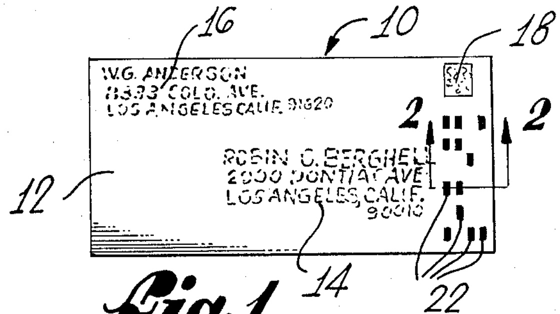
FIG. 1 is a front elevational view of a mailing envelope embodying the automatic sorting arrangement of the present invention.

As shown in the exemplary drawings, the present invention is embodied in a mailing package, indicated generally by reference numeral 10 in FIG. 1. In this instance, the mailing package 10 is illustrated as an ordinary mailing envelope 12 having an original address 14 printed or written on its front face, a return address 16 in the upper left-hand corner, and a postage mark 18 in the upper right-hand corner. As can best be seen in FIG. 2, the envelope 12 can contain an ordinary piece of correspondence 20 folded to fit in the envelope and substantially filling the envelope.

In accordance with the present invention, a method for arranging the mailing package 10 is provided for facilitating the automatic sorting of the package by optical scanning equipment. The apparatus and method of this invention includes providing a first sheet having a distinct optical reflectivity, and providing a second sheet of a contrasting reflectivity, overlying the first sheet and having a prearranged array of apertures 22 (FIG. 1) therethrough.

Figure 2:
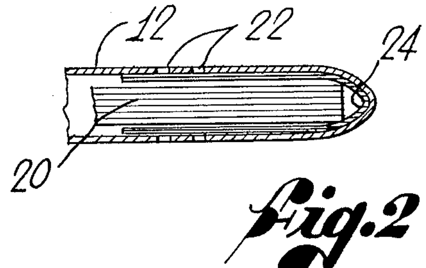
FIG. 2 is an enlarged, fragmentary, cross-sectional view of one end of the mailing envelope and contents of FIG. 1, and taken generally along the line 2—2 of FIG. 1.

In the exemplary embodiment illustrated in FIG. 1, the first sheet can be a dark panel printed on the back of the piece of correspondence 20 in a position to underlie the apertures 22, and the second sheet is the front of the envelope 12. Alternatively, as illustrated in FIG. 2, the first sheet can be a separate background sheet 24 of a dark color, preferably black, folded about one end of the correspondence 20, thereby constraining the background sheet 24 to remain behind the array of apertures 22.

With this arrangement, the first sheet is visible from outside of the envelope 12 only through the apertures 22, and appears as an array of dark rectangles on a light field. By preselecting the array of apertures 22 to conform to a coded representation of the addressees' location, such as a zip code or other location code, the package can be automatically sorted by appropriate optical scanning equipment.

The apertures 22 are preferably arranged to represent a location code according to a well known binary coding system, and this arrangement can easily be adapted to accommodate an expanded mail coding system identifying specific mail drop locations, thus requiring more than five digits which presently comprise a zip code in the United States. The array of apertures 22 can be punched through the envelope 12, before the contents are inserted in the envelope, by a mechanical or electronic device (not shown) which can be used to reproduce from a master card or a computer memory bank a hole pattern representing any desired location code.

Moreover, it will be appreciated that, although the present invention is disclosed as providing an array of dark rectangles on a light field, a system employing any contrasting shades, such as light rectangles on a dark field, or the rectangles and field being simply of contrasting colors, such as red and blue, can be employed. Whatever contrasting shades are employed, it is only necessary that the optical scanning equipment used to sort the mail be capable of distinguishing between the rectangles and the field. In this specification, the distinction between the rectangles to be read and the field upon which they are arranged will be referred to generally as having contrasting optical reflectivities, and specifically as being dark and light. Further, the apertures will be referred to as rectangles, but it will be appreciated that apertures of any desired shape will function satisfactorily.

Accordingly, the apparatus and method of this invention provide a facility whereby ordinary personal or business mail can be quickly and easily sorted and directed to its destination. As will be discussed in greater detail below, special provision can be made to conveniently encode and handle return mail, which represents a substantial portion of all mail processed.

Figure 10:
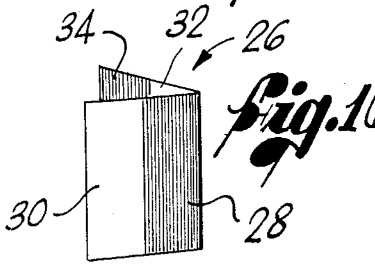
FIG. 10 is a perspective view of a foldable background sheet for use in outgoing and return mailing of ordinary correspondence.

In accordance with a further feature of the present invention, mail can be arranged to be easily and conveniently coded for automatic sorting by optical scanning equipment when addressed first to the original addressee, and then for return to the original sender. This can be accomplished by providing, in addition to the array of apertures 22, a return array of coded apertures (not shown) in the envelope 12 adjacent the array of apertures 22 at the end of the envelope. For selectively placing a dark background behind one or the other of the arrays of apertures, a foldable background sheet 26 (FIG. 10) having both dark and light areas is provided.

When the package is arranged for mailing to an original addressee, a dark area 28 of the background sheet 26 underlies the array of apertures 22 representing the addressee's location code, and a light area 30 underlies the return coded array. Conversely, when the package is arranged for return mailing, the sheet 26 can be folded over so that a light area 32 underlies the array representing the addressee's location code, and a dark area 34 underlies the return coded array. It will be apparent that this embodiment contemplates using a returnable, resealable envelope.

Figure 3:
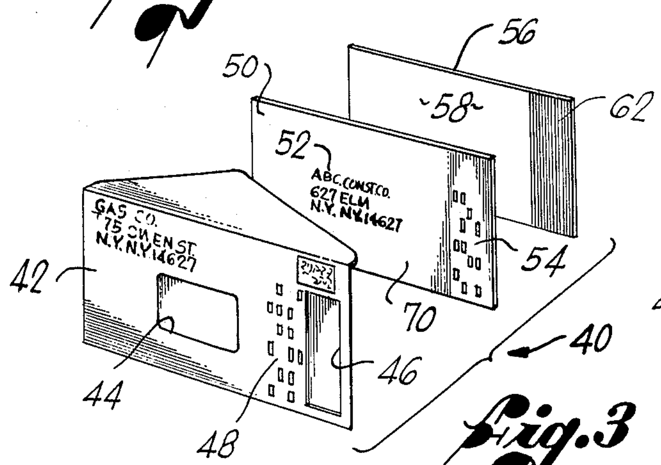
FIG. 3 is an exploded, perspective view of a mailing package arranged in accordance with an alternative embodiment of the present invention.
Figure 4:
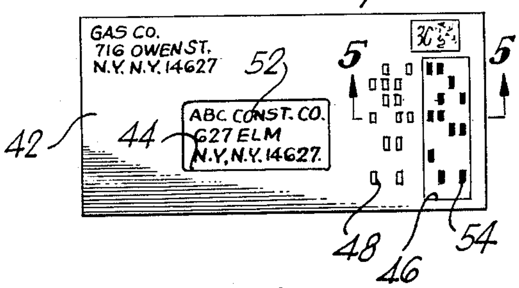
FIG. 4 is a front elevational view of the mailing package of FIG. 3, and illustrated as assembled for mailing to an original addressee.

An alternative embodiment of an outgoing and return mailing package, indicated generally by reference numerals 40 in FIG. 3, is specially adapted for periodic billing and remittance transmittal, and is illustrated in exemplary FIGS. 3 through 8. As can best be seen in FIG. 3, a two-way, resealable envelope 42 includes a central opening 44 through which either the customer's or the billing company's address can be read in a conventional manner, and a vertically elongated window 46 adjacent one end of the envelope 42, through which the customer's code can be read by optical scanning equipment, as described below. The envelope 42 is also pre-punched with an array of apertures 48 representing the billing company's return address code, in an area adjacent the window 46.

The package 40 further includes a billing statement 50 having the customer's address 52 printed on one side at a location to be visible through the central opening 44 in the envelope 42, and having an array of apertures 54 adjacent one end, coded to represent that customer's address, and located to be visible through the window 46 when the billing statement 50 is inserted in the envelope 42. The billing statement is intended to be retained by the customer, and can be printed with relevant data (not shown) concerning the amount and nature of charges to be paid.

Figure 6:
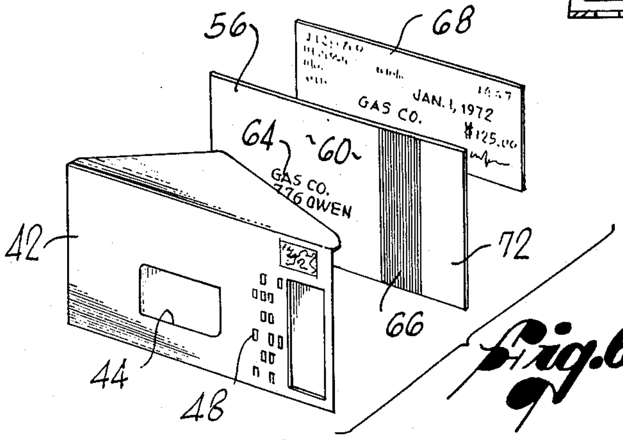
FIG. 6 is an exploded, perspective view of the mailing package illustrated in FIGS. 3 through 5, and illustrated as assembled for return mailing to an addressor.

A remittance transmittal card 56 is included in the package 40 and has an obverse side 58 and a reverse side 60 (FIG. 6). The obverse side includes a dark area 62 located and sized to underlie the array of apertures 54 and the window 46. The reverse side 60 is imprinted with the billing company's return address 64 located to be visible through the central opening 44, and further includes a dark area 66 located and sized to underlie the return coded array of apertures 48 in the envelope 42.

When the package 40 is arranged for mailing to the customer, the billing statement 90 is inserted in the envelope 42 with the array of apertures 54 representing the addressee's code appearing in the window 46, and the remittance transmittal card 56 is disposed behind the billing statement 50 with the dark area 62 underlying the addressee's code and the window 46. As can best be seen in FIG. 4, this arrangement results in the customer's written address 52 appearing in the central opening 44, and the dark area 62 of the remittance transmittal card 56 appearing through the array of apertures 54 and the window 46 as a coded array of dark rectangles on a light surface. Moreover, since a blank area 70 of the billing statement 50 underlies the array of apertures 48 in the envelope 42, the optical scanning equipment will not read the apertures 48 coded to represent the return address.

Figure 5:
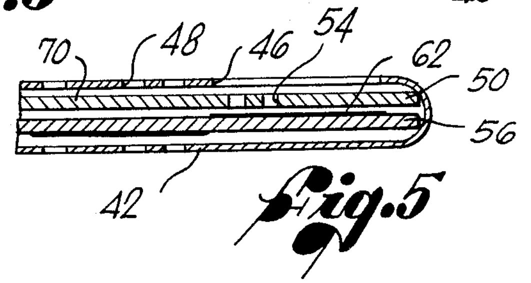
FIG. 5 is an enlarged, fragmentary, cross-sectional view of the alternative embodiment illustrated in FIGS. 3 and 4, and taken generally along line 5—5 of FIG. 4.

FIG. 5 illustrates the relative position of the billing statement 50 and transmittal card 56 within the envelope 42 when the package 40 is assembled for mailing to the customer. That is, the array of apertures 54 representing the customer's address is visible through the window 46, and the dark area 62 underlies the apertures 54 and the window 46 so that the scanning equipment will sort the package according to the customer's location code. The return coded apertures 48 are gang punched in the envelope 42 and the window 46 is provided for the customer's address code, rather than punching this code in the envelope, so that any envelope 42 can be used to send a statement to any customer, instead of having to match each statement with a specific envelope.

In order to arrange the package 40 for return mailing to the billing company, the customer simply retains the billing statement 50 and reverses the transmittal card 56 so that the company's printed address 64 appears in the central opening 44. In this position, the dark area 66 on the reverse side of the transmittal card 56 will provide a dark backing for the array of apertures 48 representing the billing company's return address code. Payment can be made by placing a check 68 in the envelope 42 behind the transmittal card 56, as can best be seen in FIGS. 6 and 8.

Figure 7:
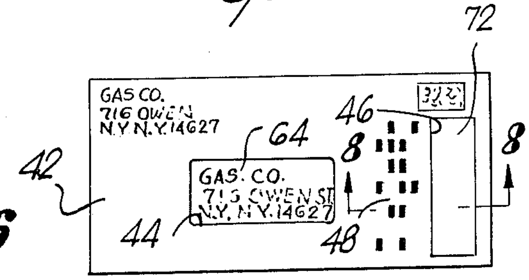
FIG. 7 is a front, elevational view of the mailing package of FIG. 6, and illustrated as assembled for mailing.
Figure 8:
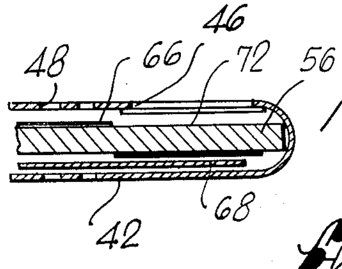
FIG. 8 is an enlarged, fragmentary, cross-sectional view of the mailing package of FIG. 7, and taken generally along line 8—8 of FIG. 7.

As can best be seen in FIG. 7, this arrangement results in the billing company's written address 64 appearing in the central opening 44, and the dark area 66 of the remittance transmittal card 56 appearing through the array of apertures 48 in the envelope 42. Moreover, since a blank area 72 on the reverse side 60 of the transmittal card 56 underlies the window 46, the optical scanning equipment will direct the package 40, as thus assembled, to the billing company, as desired.

Figure 9:
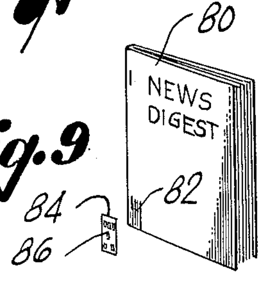
FIG. 9 is an exploded, perspective view of an embodiment of the present invention adapted for use in mailing periodicals.

In order to arrange a periodical, such as a newspaper or magazine, to be sorted by optical scanning equipment, as can best be seen in FIG. 9, a periodical, such as a magazine 80, can be provided with a dark panel 82 which can either be printed on the surface of the magazine 80 or applied thereto in the form of an adhesive patch or the like. An adhesive label 84, arranged with the appropriate array of apertures 86 representing the subscriber's address code, can then be placed over the dark panel 82, thereby permitting the magazine 82 to be sorted by automatic scanning equipment in the same manner as the packages 10 and 40 above.

From the foregoing, it will be appreciated that the present invention provides a method and apparatus by which ordinary personal or business mail can be quickly and easily sorted and directed to its destination. Moreover, the method and apparatus of this invention can be easily adapted to accommodate any address coding system, and special provision can be made to conveniently address and handle return mail.

While several particular forms of the invention have been illustrated and described, it will also be apparent that various modifications can be made without departing from the spirit and scope of the invention.

I claim:

1. An apparatus for facilitating the automatic sorting of mail by optical scanning, said apparatus comprising:

a first sheet including a surface having a first optical reflectivity;

a second sheet including a surface having a second, contrasting optical reflectivity, and including a coded array of apertures therethrough, said second sheet overlying said first sheet so that said surface of said first sheet is visible through said apertures in said second sheet and in optical contrast to said surface of said second sheet;

said second sheet being a mailing envelope, and said first sheet being disposed in said envelope and constrained to remain below said array of apertures; and the apparatus being further characterized in that said array of apertures is arranged adjacent one end of said envelope, a piece of correspondence is disposed in said envelope, said piece of correspondence being sized to substantially fill said envelope, and said first sheet is arranged to be folded about one end of said piece of correspondence in order to constrain said first sheet below said array of apertures.

2. An apparatus for facilitating the automatic sorting of mail by optical scanning, said apparatus comprising:

a first sheet including a surface having a first optical reflectivity:

a second sheet including a surface having a second, contrasting optical reflectivity, and including a coded array of apertures therethrough, said second sheet overlying said first sheet so that said surface of said first sheet is visible through said apertures in said second sheet and in optical contrast to said surface of said second sheet;

said second sheet being a mailing envelope, and said first sheet being disposed in said envelope and constrained to remain below said array of apertures; and the apparatus being further characterized in that said envelope includes two separate arrays of coded apertures arranged adjacent one another, and said first sheet includes a plurality of surfaces each characterized by either said first or said second optical reflectivity, said surfaces being arranged adjacent one another and sized to underlie said separate arrays of coded apertures so that in a first position of said first sheet, a surface of said first sheet having said first optical reflectivity underlies a first of said arrays, and a surface of said first sheet having said second optical reflectivity underlies a second of said arrays, and in a second position of said first sheet, a surface of said first sheet having said first optical reflectivity underlies the second of said arrays, and a surface of said first sheet having said second optical reflectivity underlies the first of said arrays.

3. An apparatus for facilitating the automatic sorting of mail by optical scanning, said apparatus comprising:

a first sheet including a surface having a first optical reflectivity;

a second sheet including a surface having a second, contrasting optical reflectivity, and including a coded array of apertures therethrough, said second sheet overlying said first sheet so that said surface of said first sheet is visible through said apertures in said second sheet and in optical contrast to said surface of said second sheet; and the apparatus being further characterized in that said first sheet is sized to fit in a mailing envelope, said surface of said first sheet having said first optical reflectivity being located adjacent one end thereof, said second sheet is similarly sized to fit in said mailing envelope with said array of apertures overlying said surface of said first sheet, and said envelope includes a window adjacent one end thereof sized and located to permit optical scanning of said surface of said first sheet through said apertures in said second sheet from outside of said envelope.

4. A mailing package for facilitating automatic sorting of original and return mail by optical scanning, said package comprising:

a mailing envelope having a window adjacent one end and an array of apertures adjacent said window coded to represent a return address for said envelope;

a first sheet sized to fit in said envelope and having an obverse and a reverse side, said obverse side including a first surface arranged to underlie said window and having a first optical reflectivity, said first sheet having on said reverse side a second surface also having said first optical reflectivity, said second surface located and sized to underlie said array of apertures coded to represent said return address; and a second sheet having an array of apertures adjacent one end, said array being coded to represent an original address and said array being arranged to be disposed between said first surface on said first sheet and said window;

said envelope and said second sheet having a second, contrasting optical reflectivity, whereby when said array of apertures in said second sheet is disposed between said first surface on said first sheet and said window, said first surface is visible from outside of said envelope through said apertures in said second sheet and through said window for sorting according to said original address; and when said first sheet is disposed in said envelope withh said second surface underlying said array of apertures in said envelope, said second surface is visible from outside of said envelope through said apertures in said envelope for sorting according to said return address.

* * * * *